United States Patent
Jokimies

(10) Patent No.: US 6,978,142 B2
(45) Date of Patent: Dec. 20, 2005

(54) CELL PRIORITIZING IN A CELLULAR RADIO SYSTEM

(75) Inventor: Matti Jokimies, Salo (FI)

(73) Assignee: Nokia Mobile Phones Limeted, Espoo (FI)

(*) Notice: Subject to any disclaimer, the term of this patent is extended or adjusted under 35 U.S.C. 154(b) by 437 days.

(21) Appl. No.: 09/028,726

(22) Filed: Feb. 24, 1998

(65) Prior Publication Data

US 2001/0011019 A1    Aug. 2, 2001

(30) Foreign Application Priority Data

Feb. 28, 1997 (FI) .................................. 970855

(51) Int. Cl.[7] ................................................ H04Q 7/20
(52) U.S. Cl. ................... 455/449; 455/435.2; 455/436; 455/525
(58) Field of Search ................................ 455/422, 432, 455/436, 512, 517, 524, 437, 449, 450, 455, 455/422.1, 525, 435.2

(56) References Cited

U.S. PATENT DOCUMENTS

| | | | | |
|---|---|---|---|---|
| 4,916,728 A | | 4/1990 | Blair ........................... 379/59 |
| 5,159,625 A | * | 10/1992 | Zicker ......................... 455/432 |
| 5,301,356 A | * | 4/1994 | Bodin et al. ................. 455/436 |
| 5,353,332 A | * | 10/1994 | Raith et al. .................. 455/455 |
| 5,438,608 A | * | 8/1995 | Kojima ........................ 455/411 |
| 5,442,807 A | * | 8/1995 | Takayama .................... 455/453 |
| 5,448,752 A | | 9/1995 | Mabey ....................... 455/33.1 |
| 5,570,411 A | * | 10/1996 | Sicher ......................... 455/450 |
| 5,590,397 A | * | 12/1996 | Kojima ........................ 455/414 |
| 5,603,081 A | * | 2/1997 | Raith et al. .................. 455/435 |
| 5,613,213 A | * | 3/1997 | Naddell et al. .............. 455/414 |
| 5,615,249 A | * | 3/1997 | Solondz ....................... 455/450 |
| 5,649,289 A | * | 7/1997 | Wang et al. ................ 455/31.3 |
| 5,722,070 A | * | 2/1998 | Alford ......................... 455/425 |
| 5,754,955 A | * | 5/1998 | Ekbatani ...................... 455/422 |
| 5,784,693 A | * | 7/1998 | Barber et al. ................ 455/434 |
| 5,854,980 A | * | 12/1998 | Takahashi et al. ........... 455/434 |
| 5,870,674 A | * | 2/1999 | English ........................ 455/432 |
| 5,930,721 A | * | 7/1999 | Fried et al. .................. 455/466 |
| 5,950,125 A | * | 9/1999 | Buhrmann et al. .......... 455/422 |
| 5,966,668 A | * | 10/1999 | Lindroth ...................... 455/555 |
| 5,999,811 A | * | 12/1999 | Molne ...................... 455/432.3 |
| 6,018,666 A | * | 1/2000 | Chavez, Jr. .................. 455/465 |
| 6,044,261 A | * | 3/2000 | Kazmi ......................... 455/408 |
| 6,058,302 A | * | 5/2000 | Westerberg .................. 455/411 |
| 6,094,581 A | * | 7/2000 | Fried et al. .................. 455/449 |

(Continued)

FOREIGN PATENT DOCUMENTS

EP     0 749 254 A1    12/1996

(Continued)

OTHER PUBLICATIONS

ETSI (European Telecommunications Standards Institute) ETS 300 535 (GSM 03.22).

(Continued)

Primary Examiner—Charles N. Appiah
(74) Attorney, Agent, or Firm—Perman & Green, LLP

(57) ABSTRACT

In a cellular radio system (30) the terminals (35) are arranged to set up and maintain radio communication with the base stations (31, 32, 33, 34) in the cells (31a, 32a, 33a, 34a). Regarding the setting up and maintaining of radio communication at least one terminal (35) is arranged to favor at least one cell (32a, 33a) with respect to other cells (31a, 34a), in a manner independent of other terminals. The priority data relating to a terminal are stored in a central database (37), from which they are transmitted to the terminal when it registers.

22 Claims, 2 Drawing Sheets

U.S. PATENT DOCUMENTS 6,167,283 A * 12/2000 Korpela et al. ............. 455/525
6,253,074 B1 * 6/2001 Carlsson et al. ............ 455/414

FOREIGN PATENT DOCUMENTS

| EP | 0 844 798 A2 | 5/1998 | |
|---|---|---|---|
| ES | 2 100 740 | 6/1996 | |
| GB | 2 294 181 A | 4/1996 | |
| SE | 503 949 | 10/1996 | |
| WO | WO 94/30023 | 12/1994 | |
| WO | WO 95/02309 | 1/1995 | |
| WO | 95/07010 | * 3/1995 | ............ H04Q 7/32 |
| WO | WO 95/07010 | 3/1995 | |
| WO | WO 95/07010 A1 | * 3/1995 | ............ H04Q 7/32 |
| WO | WO 95/24809 | 9/1995 | |
| WO | WO 96/06512 | 2/1996 | |
| WO | WO 97/13387 | 4/1997 | |
| WO | 99/13670 | * 3/1999 | |

OTHER PUBLICATIONS

ETSI (European Telecommunications Standards Institute) ETS 300 578 (GSM 05.08).

ETSI "Digital cellular telecommunications system (Phase 2+); Radio subsystem link control" (GSM 05.08) Version 5.1.0, 1996.

PCT International Search Report issued on PCT/FI98/00182.

* cited by examiner

CELL PRIORITIZING IN A CELLULAR RADIO SYSTEM

FIELD OF THE INVENTION

The invention relates generally to the routing of radio communication between base stations and terminals in a cellular radio system. Particularly the invention relates to a method and equipment with which the terminals can be individually controlled to give priority to particular base stations.

BACKGROUND ART

A cellular radio system comprises stationary base stations, each having a particular coverage area, and terminals which can move in relation to the base stations and their coverage areas. The coverage areas are also called cells. In this patent application a mobile phone is treated as an illustrative terminal. When a particular mobile phone is switched on, it somehow tries to find the best received signal of a base station and tries to register with the so called location area (LA) which this base station represents. Registration means that the mobile phone informs the mobile network through the base station that it can receive calls via that location area, to which said base station is associated. In the idle mode a mobile phone regularly receives messages transmitted by the base station in order to detect paging messages, which represent an incoming telephone call, and other messages intended for this mobile phone. At the same time the mobile phone monitors the power of signals transmitted by other adjacent base stations, so that it rapidly can shift base stations, when required.

The idle mode operation of a mobile phone according to the GSM system (Global System for Mobile telecommunications) and its extension the DCS1800 (Digital Communications System at 1800 MHz) is described below, in order to explain the background of the invention. Said functions are described in more detail in the EBU (European Broadcasting Union) and ETSI (European Telecommunications Standards Institute) standards ETS 300 535 (GSM 03.22) and ETS 300 578 (GSM 05.08). To a person skilled in the art it is obvious that as a background of the invention the main part of these studies can be generalised so that they are applicable to all digital cellular radio systems.

There are four requirements on a cell, so that a mobile phone normally can camp within it:
the cell must belong to the network of the selected operator;
the cell must not be barred by the network;
the location area represented by the cell must not be included in the list of forbidden location areas defined for each mobile phone; and
the attenuation on the radio path between the mobile phone and the base station must be lower than a certain threshold value defined by the operator (for short this requirement is called the path loss criterion).

A cell which meets the above listed requirements is called a suitable cell. When a mobile phone is switched on it receives the so called BCCH signals (Broadcast Control CHannel) and runs through them in their order of strength, and begins to operate in a suitable cell with the strongest signal. The BCCH signal can also contain a recommendation value attached to the cell which tells whether the cell is recommended by the system or not. The mobile phone begins to operate in a not recommended cell only if no suitable recommended cells are available. This step is called cell selection.

The mobile phone will regularly check whether there is a suitable cell in the vicinity which is more advantageous regarding the radio communication, and if required the mobile phone will perform cell reselection. The mobile phone can select a new cell for three alternative reasons:
according to particular cell reselection criteria the new cell is better than the current cell;
some characteristics of the current cell change, so that this cell is no longer suitable, but the new cell is suitable; or
the mobile phone detects that the downlink signalling connection is interrupted in the current cell.

Cell selection and cell reselection are based on two parameters calculated by the mobile phone, the so called C1 and C2 parameters defined in the standard ETS 300 578 (GSM 05.08). Of these the first one, the C1 parameter, describes the power level received by the mobile phone from the examined base station, in relation to the minimum value of the received power level defined by the system and the maximum permissible transmission power of the mobile phone. The value of the C2 parameter is influenced by the value of the C1 parameter and two correction factors, of which the first one is an offset parameter transmitted by the base station and the second one is a time delay, which aims at preventing rapid consecutive cell reselections by the mobile phone.

Successful management of radio communication or the optimal routing of connections between the terminals and the base stations has an essential effect on the service level which the radio system is able to provide to the users. Particularly in areas with very dense traffic the cells can be partly or totally overlapping, whereby it is required that the mobile phones and other terminals can be controlled to use particular cells and avoid particular other cells in order to guarantee a uniform service level. As an example we could consider an office building which is located within the coverage area of a public cellular radio system, but which also has an internal wireless communication system operating as an extension to the public system, whereby the wireless system is based on so called nano cells or pico cells having a size of one room or a few rooms. For a mobile phone belonging to an employee working in the building it is often more advantageous to operate in a cell of the building's internal system than in a cell of the public cellular radio system. The operator managing the cellular radio system can for each mobile phone also define a so called home area comprising a single cell or a few cells of the public cellular radio system, where the mobile phone is offered cheaper tariffs or other benefits in the home area. On the other hand it is advantageous to define some cells as handover cells only, whereby it is desired that no mobile phones operate in such a cell for a longer period than required by the handover function.

In a system according to the prior art described above there are no possibilities to realise priority cells relating to individual mobile phones. The first correction factor or the offset parameter associated with the C2 parameter's definition can be used for general prioritising, so that a certain value of the offset parameter transmitted by a base station causes all mobile phones to generate a C2 parameter value indicating a disadvantageous cell selection. However, a prioritising of this type does not function differently for each mobile phone, but it is identical for all mobile phones.

From the patent publication U.S. Pat. No. 4,916,728 (Blair) a practice is known in which a mobile phone can operate in networks managed by several different operators. In order to be able to select the network of the most advantageous operator the mobile phone goes through several receive frequencies, decodes the SID codes (System IDentification) from the signals transmitted by the base stations, and tunes to that frequency on which the received SID code indicates the most advantageous operator. The information about the advantages of different operators is stored in the memory of the mobile phones, so in this arrangement different mobile phones react differently on the information transmitted by the base stations. However, in this method it is not possible to have the mobile phones to function differently, except for the selection of the operator, because all base stations in the network of a certain operator transmit the same SID code.

The PCT application publication WO 95/24809 (Motorola Inc.) treats a system in which the central equipment checks, based on the identity transmitted by the mobile station, whether this mobile station is authorised to a certain service in a particular area. If particular regional restrictions and/or restrictions relating to individual mobile phones are defined for the service, then the central equipment can either refuse to provide any services to a particular mobile phone in said region, or allow the use of only one service, e.g. data communications. However, in order to change the offered services the mobile phone must move, because the restrictions are always the same in a particular region. Thus in this method it is not possible to influence the cell selection or cell reselection when the mobile phone or another terminal of the cellular radio system is stationary.

From the Finnish patent application no. FI 952965 and the corresponding European patent publication no. EP 749 254 A1 (Nokia Mobile Phones Oy) there is known a multi-level home area pricing for a mobile phone of a cellular radio system, in which a certain binary character string is stored in the mobile phone. Then each base station transmits its own binary identity at regular intervals and the mobile phone uses the binary character string stored in it as a mask, with which it selects particular bits from the character string transmitted by the base station as the object for a logical comparison operation. If said logical comparison operation generates the correct result the mobile phone construes itself to be in the home area or in another area where a particular regional service is available. Using different logical comparison operations it is possible to form a number of individual areas, or areas located in a mutual hierarchy in which the mobile phone can obtain different services from the cellular radio system. Even this practice is not applicable for proper cell prioritising, because the services are regional and the offered services change only when the mobile phone is moving.

In addition to the above mentioned known methods there are a number of known methods and systems in which a mobile phone or another terminal of a cellular radio system can detect whether or not it operates in a priority cell associated to this device, and provide information about this to the user. However, in any of these methods a user or a terminal is not able to contribute to the cell selection and to decide whether a certain cell selection is retained even when the terminal is stationary.

SUMMARY OF THE INVENTION

The object of this invention is to present a method and a system which, for each terminal, are able to effectively influence in which cell of the cellular radio system the terminal of the cellular radio system begins to operate when it is switched on, and which cell it selects in connection with cell reselection. An object of the invention is also that the method and the system according to the invention are flexible and able to accommodate changes made in the priority definitions.

The objects of the invention are attained in a terminal of the cellular radio system by adding, to the calculation operation controlling the cell selection and the cell reselection, a step and/or a factor which depends on the contents of the list of priority cells given to the terminal.

The cellular radio system according to the invention is characterized in that regarding the setting up and maintaining of radio communication at least one terminal is arranged to favor at least one cell with respect to other cells, in a manner independent of other terminals.

A further object of the invention is a terminal, which is characterized in that regarding the setting up and maintaining of radio communication it is arranged to favor at least one cell with respect to other cells in a manner independent of other terminals.

Further the invention relates to a method for realizing priority cells. The method according to the invention is characterized in that regarding the setting up and maintaining of radio communication it utilizes priority data relating to individual terminals in order to favor at least one cell with respect to other cells, in a manner independent of other terminals.

In the arrangement according to the invention it is possible to define for each terminal of the cellular radio system one cell or several cells in which the terminal shall try to operate as far as the quality of the radio communication allows it. A list of priority cells relating to individual terminal is stored in a certain database of the system from which it is read and transmitted sufficiently often to the terminal, preferably always when the terminal is registered or when it shifts location area, or when the list of priority cells is altered. Thus the terminal always has an updated list of the priority cells.

In cell reselection the terminal can be made to favour the priority cells, in the simplest manner by programming it so that when the C2 parameter of the priority cell is calculated the offset parameter and the delay factor are given zero values, or they are given other such values which generate a C2 parameter value representing a particularly preferred selection of a cell. Via the base stations the system can transmit to the terminal a message, in which particular flag bits or other information sections allow the terminals to apply cell prioritizing or deny it. This message is preferably the same as the message which includes the list of the priority cells.

BRIEF DESCRIPTION OF THE DRAWINGS

The invention is described in more detail below with reference to preferred embodiments presented as examples, and to the enclosed figures, in which.

DESCRIPTION OF THE PREFERRED EMBODIMENT.

Figure 1:
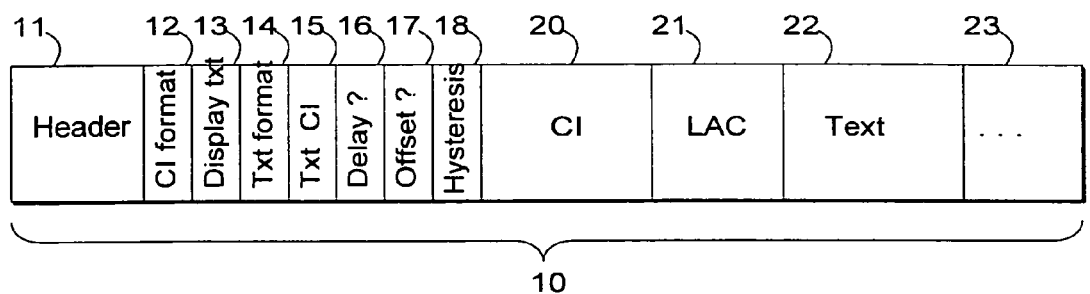
FIG. 1 shows schematically a message transmitted by the cellular radio system.

FIG. 1 shows schematically a so called priority information (PI) message, with which a cellular radio system according to the preferred embodiment of the invention controls cell priorities in individual terminals. It has the following fields:

11 Header

The header defines that this is a message transmitting priority information from the cellular radio system to a particular terminal. The invention does not otherwise restrict the contents or the structure of the header.

12 CI format

With the aid of this field the systems tells whether the terminal should base its operation only on the cell identity (CI) code, on a combination of the cell identity and the location area code (LAC), or only on the LAC of the base station. The system can have cells which have the same cell identity but are located in different location areas, whereby also the LAC is required in order to have an unequivocal identification of the cell. To the user the terminal can also on a display present information relating to a single cell (CI or CI+LAC), to several cells (several cell identities or the LAC+several cell identities), or to the whole location area code (LAC).

13 Display txt

With the aid of this field the systems defines whether the terminal will present to the user the messages mentioned in connection with the previous field only in the idle mode, or also during a call.

14 Txt format

With the aid of this field the systems defines whether the terminal will present to the user a text which is common to all cells, or only text which is unique to the cell.

15 Text CI

With the aid of this field the systems defines how the below presented short text messages and the priority cells are related to each other (ref. cells 20 and 22).

16 Delay?

The description of prior art presented the time delay (the so called penalty time) used in the calculation of the C2 parameter, during which delay a particular cell only recently included in the list of suitable cells gets as its C2 parameter a value showing a disadvantageous selection. In this field the system can give an instruction to the terminal, according to which the terminal does not apply the time delay in the calculation of the C2 parameter for the priority cells.

17 Offset?

The description of prior art presented the offset parameter used in the calculation of the C2 parameter, with which it is possible to have priorities relating to a base station. In this field the system can give to the terminal an instruction, according to which it does not apply the offset parameter in the calculation of the C2 parameter for the priority cells.

18 Hysteresis

CRH (Cell Reselection Hysteresis) means that the terminal which shifted cells and base stations can not immediately shift back to its previous cell. The aim of the CRH is to reduce the number of cell reselections between the location areas. If the new cell is in a different location area than the current cell, then the C2 parameter is not applied as such, but with the addition of the value indicated in the CRH. With this field the system can give the terminal an instruction according to which it does not apply hysteresis on the priority cells, whereby the terminal easily shifts to a priority cell, even if this cell would be in a different location area. The hysteresis prevents a terminal, which shifted into a priority cell, from immediately shifting back to a non-priority cell located in a different location area.

20 CI

This field contains the identities of all priority cells. They can be in a sequence, whereby the next field contains the respective LAC codes in a sequence, or the fields 20 and 21 can alternate so that the cell identity (CI) and the LAC are presented in sequence for each priority cell. The preferred length of one cell identity (CI) is for instance 2 octets (16 bits).

21 LAC

For each priority cell this field contains the respective location area code (LAC), and the length of the field is preferably 2 octets (16 bits). The alternatives for the mutual order of the CI and LAC codes were described above.

22 Text

This field contains short text messages (e.g. 16 octets or eight alphanumeric characters per message), which are intended to be displayed to the user in the display of the terminal when the terminal operates in the respective cell (ref. fields 13, 15 and 20). The text messages can relate to a cell, to a cell group, or to a location area (ref. field 12).

23 . . .

The invention does not otherwise limit the contents of the PI message 10, so that it may also contain other fields than those listed above.

Figure 2:
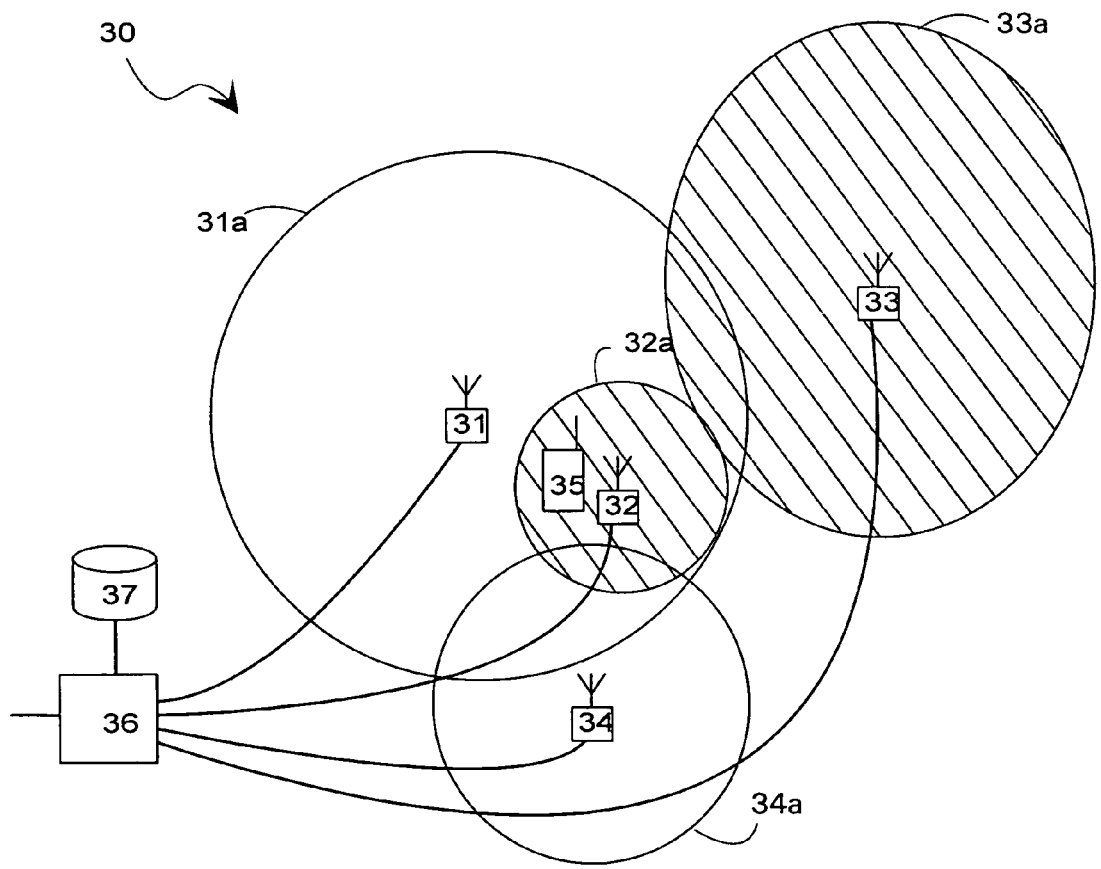
FIG. 2 shows schematically a cellular radio system which applies cell prioritising.

FIG. 2 shows a cellular radio system 30 which has base stations 31, 32, 33 and 34 with their coverage areas or cells 31a, 32a, 33a and 34a. The block 36 simply represents the other stationary parts of the cellular radio network, such as base station controllers, switch equipment, connections to other communication networks, and so on. A database 37 is also connected to this block. The operation of a mobile phone 35 in the cellular radio system 30 is discussed below.

Let's assume that the priority cells 32a and 33a are defined for the mobile phone 35, which is shown by the hatched lines in these cells. The cell identities representing these cells and the other parameters controlling the priority practice of the mobile phone are stored in the database 37, which physically can be located at a mobile services switching centre (MSC; not shown in the figure) or at some other location where the operator managing the cellular radio system 30 generates so called intelligent network (IN) services for the network. When the mobile phone 35 is switched on, or when it otherwise arrives in the area of the cellular radio system 30 it will set up a connection to a base station in a manner known per se, and then according to prior art it transmits a so called IMSI Attach request to the network 36, whereby it is registered to operate within the network area, and its location is updated in the location databases (not shown in the figure) of the network. In an arrangement according to a preferred embodiment of the invention the network 36 then transmits to the mobile phone a PI message (priority information) according to FIG. 1, which contains a list of priority cell identities read from the database 37, whereby the message is a prior art USSD message (Unstructured Supplementary Service Data) or SMS message (Short Message Service).

The list of priority cell identities and the other parameters regarding the priority practice could of course also be permanently stored in the memory of the mobile phone 35, but the above described use of the database associated to the network provides some particular advantages. The most important of these is the automatic updating of the information in the mobile phone. If the priority data is altered, e.g. when a new base station is installed, or due to an altered contract between the operator and the user, then the operator or any other quarter realizing the changes will record these changes in the database 37, whereby the mobile phone 35 will obtain updated information when it registers the next time, without having to visit an authorised sales representative in order to update the software. It is also possible to present an embodiment in which altered information in the database 37 automatically generates an update message from the network to the mobile phone 35 without a need to reregister. When the priority information is stored in a database of the network a dishonest user is not able to change the priority settings as easily as if the data were permanently stored in the mobile phone. The priority data can also be defined to be identical for a certain user group, whereby all mobile phones associated to the group receive PI messages which are substantially identical. The group settings are simply changed by altering the data in the database 37.

Let's assume that the mobile phone 35 has transmitted an IMSI Attach request via a non-priority base station 31 and has, via the same base station, received information about the priority cell identities. The mobile phone 35 begins to receive SI messages (System Information) transmitted on the BCCH channels by other base stations in a manner known per se, whereby it will obtain the cell identities of the other cells. For cell reselection the mobile phone generates a list of possible new cells in addition to the current cell, whereby the C2 parameters calculated for the cells are the decisive factors which determine the order in the list. In the situation shown in FIG. 2 the C2 parameter calculated for the cell 32a shows that it is more advantageous than the cell 31a, whereby the mobile phone selects the cell 32a as a new cell. A practice for generating an advantageous value for the C2 parameter of a priority cell is shown in more detail below as an example.

When the C2 parameter is calculated it is advantageous that in the PI message the mobile phone 35 is instructed not to observe the time delays of the priority cells (field 16 in FIG. 1), whereby the priority cell 32a immediately appears as a very advantageous cell on the cell reselection list. If the mobile phone 35 is at that border of the cell 32a which is close to the non-priority cell's 31a base station 31, then it probably will receive the signal transmitted by the last mentioned base station as a stronger signal than that transmitted by the base station 32. In order to have the mobile phone also, in this situation, select the priority cell 32a, the offset parameters and PI messages transmitted by the base stations 31 and 32 must be arranged so that the PI message instructs the mobile phone to calculate the C2 parameter of the priority cell 32a without the offset parameter, but to calculate the C2 parameter of the non-priority cell 31a with the offset parameter (field 17 in FIG. 1), whereby the C2 parameter representing the priority cell 32a will be as advantageous as possible also at the fringes of the cell 32a.

According to FIG. 1 the PI message contains information about whether hysteresis should be applied also in the case of priority cells (field 18 in FIG. 1). The hysteresis can be the above mentioned CRH hysteresis or the time hysteresis according to paragraph 6.2.2 in the standard GSM 05.08. In FIG. 2 the priority cell 32a is in whole within the area of the non-priority cell 31a, so that in certain situations it may happen that both cells appear to the mobile phone 35 as being almost equal regarding the cell reselection. If application of the hysteresis is prevented when cell reselection would mean shifting from a non-priority cell into a priority cell, then the mobile phone can always be made to shift rapidly from the cell 31a back to cell 32a, but to delay a shift in the opposite direction.

Next we show in more detail an exemplary practice to calculate the C2 parameter so that the above presented functions are obtained. For non-priority cells the mobile phone calculates the C2 parameters in a prior art manner known per se, i.e. by using the formulas $$C2(T) = C1 + \text{CELL\_RESELECT\_OFFSET} - \text{TEMPORARY\_OFFSET} * H(\text{PENALTY\_TIME} - T),$$

when PENALTY_TIME <> 11111, and $$C2 = C1 + \text{CELL\_RESELECT\_OFFSET},$$

when PENALTY_TIME = 11111, where the step function H(x) is defined as $H(x)=0$, when $x<0$, and $H(x)=1$, when $x>=0$.

The above mentioned offset parameter relating to a base station is here shown with the name CELL_RESELECT_OFFSET according to the GSM standards, and the above mentioned delay factor is the product of the temporary offset parameter TEMPORARY_OFFSET and the step function H, in which the value of the step function H depends on the relation between the examination moment and the defined delay PENALTY_TIME. The values of the correction factors for priority cells depend on the PI message received by the mobile phone. If the delay? field of the PI message contains a certain value (e.g. 1), then the mobile phone gives the TEMPORARY_OFFSET a zero value when the C2 parameter of the priority cell is calculated. Correspondingly, if the offset? field of the SI message contains a certain value (e.g. 1), then the mobile phone gives the CELL_RESELECT_OFFSET a zero value in the calculation of the C2 parameter for the priority cell, when PENALTY_TIME is 11111.

Figure 3:
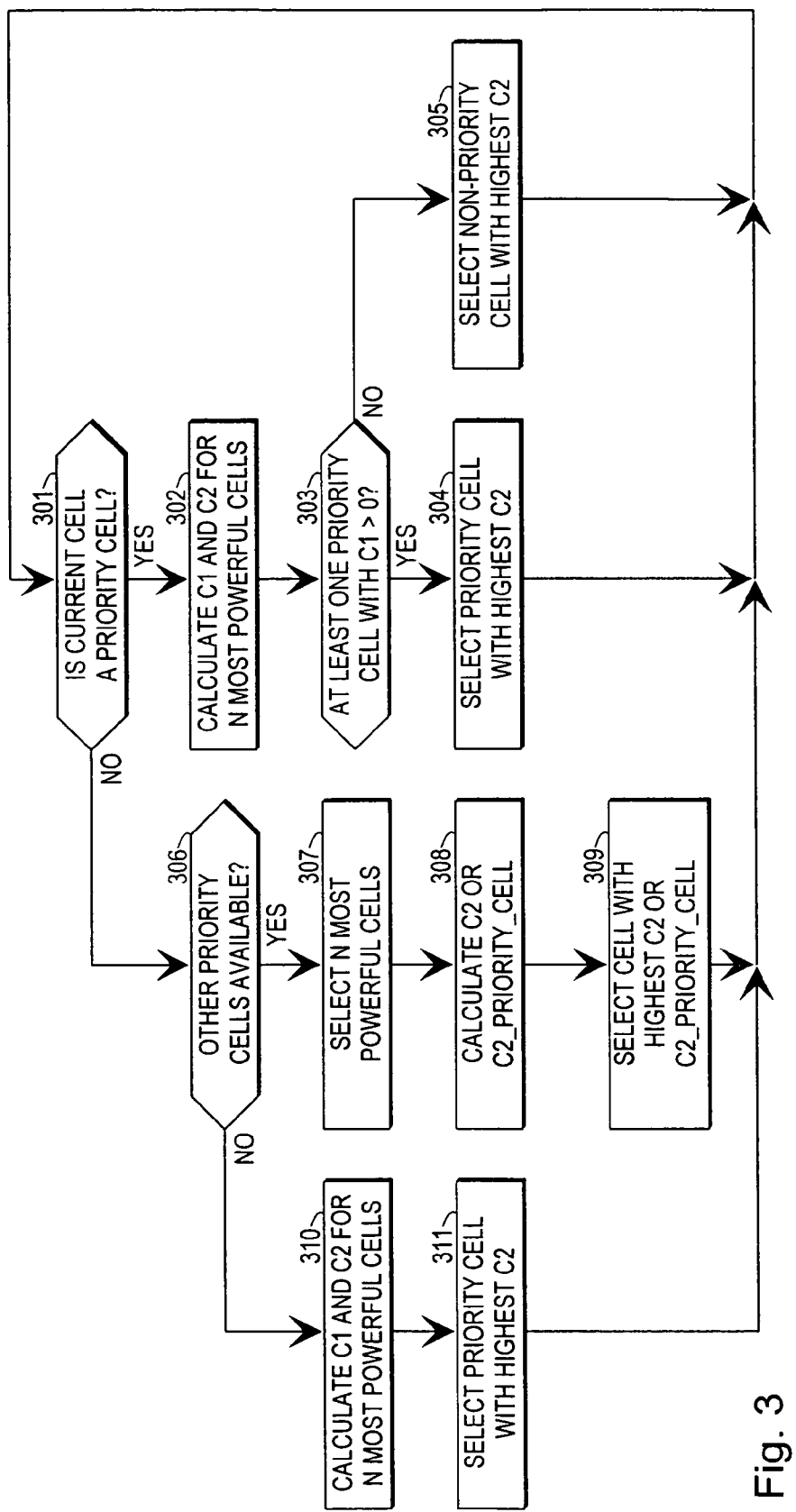
FIG. 3 illustrates an embodiment of a method according to the invention.

The modified C2 parameter could also be called C2_PRIORITY_CELL. It is advantageous if the mobile phone uses modified C2 parameter calculation only when its current cell is a non-priority cell. The operation of the mobile phone can be formulated as an algorithm in pseudo-language as follows, each step followed by a corresponding reference designator is FIG. 3:

```
IF (current cell is a priority cell) 301
    THEN calculate C1 and C2 for N cells with the highest power 302
    IF(at least 1 priority cell, including current cell, with C1 > 0) 303
        THEN select the best priority cell in the order
        determined by C2 304
    ELSE select the best non-priority cell in the order determined
    by C2 305
ELSE
    IF(any of the neighbour cells, except the current cell,
    is a priority cell) 306
        THEN {
        select N cells with highest power 307,
        calculate C2_PRIORITY_CELL for the priority cells within
        the N cells,
        calculate C2 for non-priority cells within the N cells, 308
        select best cell in the order determined
        by C2/C2_PRIORITY_CELL} 309
    ELSE {
    calculate C1 and C2 for N cells with highest level, 310
    select the best cell in the order determined by C2} 311
```

The effect of the hysteresis, whether it is used or not, does not appear in the above described algorithm, but in the light of what was presented above it is simple to add the hysteresis as a part of the comparison of the C2 or C2_PRIORITY_CELL values.

To the operator managing a cellular radio system the invention presents a wide range of possibilities to control cell priorities relating to one device. This is very advantageous, because from the network's point of view all terminals do not behave identically, so that the use of a single standard pattern for all devices would inevitably cause disadvantageous functions in some devices. As an example we may consider a situation in which a user daily moves through or past a priority cell without staying too long in the cell (for instance, the cell may be in a building, which the user with his terminal daily passes at a high speed in his car along the highway). While the cell generally speaking is a priority cell, it is not worth for the mobile phone to use this cell during such a rapid passing, because a short visit to a cell only hinders the synchronisation of the terminal in the network and causes extra signalling traffic. The operator can program the computer which monitors the system operation so that it will detect the corresponding cases. In the detected cases the respective terminal can be instructed to use a delay factor in the calculation of the C2 parameter for said priority cell, whereby during a rapid passing the cell's C2 parameter does not have time to rise to a level which would indicate advantageous cell reselection. By testing and simulating it is possible to find other corresponding situations in which the system operation can be optimised by selecting parameters relating to individual devices.

In prior art systems a terminal of the cellular radio system includes a certain fixed amount of cells in a list, on the basis of which it performs cell reselection. The length of a commonly used list is six cells. In order to better find the priority cells the length of the list can be increased to comprise e.g. as many cells as there are cells in the BA(BCCH) or BA(SACCH) messages (BCCH Allocation—Broadcast Control Channel/Slow Associated Control Channel) transmitted by the base station of the current cell. It is worth to extend the list, particularly when the terminal does not otherwise detect priority cells in the neighbourhood, but assumes on the basis of the stored handover history, or on the basis of the received LAC codes and/or cell identities, that there may be priority cells in the neighbourhood, which do not appear in the short list. Then the difference to prior art is that the terminal does not have to check all possible BCCH frequencies, but it can simply increase the number of cell identities which it keeps in its memory. The scanning of all frequencies would require more power and take more time, and the ability to receive a paging message representing an incoming call would be reduced. If there are no priority cells in the list an alternative to an extended list would be that the terminal continuously replaces the last cell in the list, so that it would get at least one priority cell on the list.

Above we presented a priority arrangement with cells of only two levels: priority cells and non-priority cells. One user can also have several geographically different "home areas", such as for instance the area at home and at the place of work. The system can regard these areas as being of equal value, so if they are very close to each other or even touch each other, they form one priority home area. However, as the cells have individual different cell identities and text attached to it (ref. the field 23 in FIG. 1) and they can have different LAC codes, then the terminal can display a different text message to the user, depending on in which priority cell of the home area it operates. Further the invention does not restrict the use of priorities at different levels, which can be realised with suitable offset parameters and control instructions transmitted via the PI message.

The terminal must receive SI messages of the so called type 3 which are transmitted by other base stations, so that it will be able to detect the cell identities of adjacent cells. This might result in that the terminal does not receive a simultaneously transmitted paging message representing an incoming call. In order to make this happen as seldom as possible the terminal must receive the SI messages of type 3 relatively seldom, e.g. only once in 30 minutes.

What is claimed is:

1. A cellular radio system, which comprises terminals, cells and a network including stationary network equipment, of which said terminals are arranged to set up and maintain radio communication with the base stations in the cells, wherein regarding the setting up and maintaining of radio communication at least one terminal is arranged to favor at least one cell with respect to other cells in a manner independent of other terminals, based on priority data transmitted to said at least one terminal in a priority identity message, and said priority data comprises at least a priority cell identity and at least one offset parameter.

2. A cellular radio system according to claim 1, wherein the stationary network equipment comprises a database for storing cell priority data relating to individual terminals.

3. A cellular radio system according to claim 2, wherein the stationary network equipment is arranged to supply information to the terminal about priority data stored in the database relating to the terminal, as a response to an excitation, which is one of the following: the terminal registers with the cellular radio system, the terminal's location data changes in the cellular radio system, the priority data in said data base is altered, a predetermined time has passed since the previous message to the terminal, which contained priority data relating to the terminal.

4. A cellular radio system according to claim 1, said priority data further comprising cell reselection hysteresis information.

5. A cellular radio system according to claim 1, wherein said at least one terminal is further arranged to favor the at least one cell based on said at least on parameter calculated for the at least on cell, said calculation being performed in said at least one terminal.

6. a cellular radio system according to claim 1, wherein said priority data is transmitted to said at least on terminal in a priority information message as a unstructured supplementary service data message or a short message service message.

7. A cellular radio system according to claim 1, wherein said at least one terminal is arranged to received system information messages via the broadcast channel of the network.

8. A cellular radio system terminal, which is arranged to set up and maintain radio communication with base stations in cells of a cellular radio system, wherein regarding the setting up and maintaining of radio communication the terminal is arranged to favor at least on cell with respect to other cells in a manner independent of other terminals, based on priority data transmitted to said terminal in a priority information message, and said priority data comprises at least a priority cell identity and at least one offset parameter.

9. A terminal according to claim 8, which is further arranged to maintain a list of possible cells for cell reselection and to arrange said list in an order which is based on a parameter calculated for each cell, wherein for priority cells the terminal is arranged to alter the parameter calculation relating to the cell, so that said parameter is a particularly advantageous value in the case of a priority cell.

10. A terminal according to claim 8, said priority data further comprising cell reselection hysteresis information.

11. A terminal according to claim 8, wherein said terminal is further arranged to favor the at least one cell based on said at least one parameter calculated for said at least one cell, said calculation being performed in said terminal.

12. A terminal according to claim 8, wherein said priority data is transmitted to said terminal in a priority information message as an unstructured supplementary service data message or a short message service message.

13. A terminal according to claim 8, wherein said terminal is arranged to received system information messages via the broadcast channel of the network.

14. A method to realize call prioritizing in a cellular radio system comprising terminals, cells and a network including stationary network equipment, of which said terminals are arranged to set up and maintain radio communication with the base stations in the cells, wherein regarding the setting up and maintaining of radio communication said terminals utilize priority data relating to a terminal in order to favor at least one cell with respect to other cells in a manner independent of other terminals, based on priority data transmitted to said terminal in a priority information message, and said priority data comprises at least a priority cell identity and at lest one offset parameter.

15. A method according to claim 14, wherein the priority data relating to a terminal is stored in a database of the stationary network equipment, and the priority data is transmitted to the terminal as a response to an excitation, which is one of the following: the terminal registers with the cellular radio system, the terminal's location data changes in the cellular radio system, the priority data in said database is altered, a predetermined time has passed since the previous message to the terminal, which contained priority data relating to the terminal.

16. A method according to claim 14, in which a terminal further maintains a list of possible cells for cell reselection and arranges said list in an order based on a parameter which is calculated for each cell, wherein for priority cells the terminal alters the parameter calculation relating to the cell, so that said parameter gets a particularly advantageous value in the case of a priority cell.

17. A method according to claim 14, wherein the priority data relating to a terminal comprises at least the priority cell identity and information about the fact whether or not the terminal shall apply an offset parameter, a delay factor relating to the cell, and cell reselection hysteresis in the calculation of the parameter relating to a priority cell.

18. A method according to claim 14, wherein the terminal does not apply the delay factor relating to the cell nor the cell reselection hysteresis when it calculates the parameter relating to a cell, in a situation where cell reselection represents shifting from a non-priority cell to a priority cell.

19. A method according to claim 14, said priority data further comprising cell reselection hysteresis information.

20. A method according to claim 14, wherein said terminal is further arranged to favor the at least one cell based on said at least one parameter calculated for at least one cell, said calculating being performed in said terminal.

21. A method according to claim 14, wherein said priority data is transmitted to said terminal in a priority information message as an unstructured supplementary service data message of a short message service message.

22. A method according to claim 14, wherein said terminal is arranged to receive system information via the broadcast channel of the network.

* * * * *